United States Patent [19]

Anderson et al.

[11] 4,064,054
[45] Dec. 20, 1977

[54] APPARATUS FOR SEPARATING OIL-WATER MIXTURES

[75] Inventors: David K. Anderson; Marvin A. Stewart, both of Avenal, Calif.

[73] Assignee: Chevron Research Company, San Francisco, Calif.

[21] Appl. No.: 753,047

[22] Filed: Dec. 22, 1976

[51] Int. Cl.² .......................................... B01D 17/02
[52] U.S. Cl. ............................. 210/536; 210/DIG. 5
[58] Field of Search .............. 210/320, 521, 522, 536, 210/537, 532 R, 533, DIG. 25, DIG. 26, 84, 83, 320, 73 OW, 538, 540, 23 R, DIG. 5, 335

[56] References Cited

U.S. PATENT DOCUMENTS

| 1,897,240 | 2/1933 | Dahlgren | 210/84 |
| 2,288,333 | 6/1942 | Vinson | 210/23 R |
| 3,407,937 | 10/1968 | Bakker et al. | 210/335 |
| 3,527,348 | 9/1970 | Lalonde et al. | 210/320 |
| 3,529,728 | 9/1970 | Middelbeek et al. | 210/522 |
| 3,849,311 | 11/1974 | Jakubek | 210/537 |
| 3,933,564 | 1/1976 | Middelbeek | 210/521 |

Primary Examiner—Wilbur L. Bascomb, Jr.
Assistant Examiner—Benoit Castel
Attorney, Agent, or Firm—R. L. Freeland, Jr.; Edward J. Keeling

[57] ABSTRACT

A wash tank is provided for separating an oil-water mixture and utilizes a plurality of baffle sections to assist in separating oil and water. The baffle sections include solid perpendicular portions and sloping perforated portions arranged in a special configuration within the tank.

2 Claims, 2 Drawing Figures

APPARATUS FOR SEPARATING OIL-WATER MIXTURES

FIELD OF THE INVENTION

The present invention relates to apparatus for separating on the surface oil and water produced from a well and more particularly the present invention relates to a baffled wash tank useful in promoting the separation of oil and water wherein solid and perforated baffles are arranged in a predetermined manner within the tank.

BACKGROUND OF THE INVENTION

Produced fluids coming from an oil well often include a mixture of petroleum, connate water and hydrocarbon gas. In order to prepare the produced fluids for handling, i.e., transportation of the petroleum and gas and disposal of the water, the mixture must be separated into separate components. Since gas in most instances will readily separate from the mixture under conditions prevailing at the surface, the principal problem is separating the produced water from the oil. Water and oil, of course, have different densities and will gravity segregate from each other if left standing long enough. However, this requires a great deal of storage space which can be very undesirable.

Many types of wash tanks have been used heretofore to separate the oil from water. These tanks have used heat, chemicals and baffles to promote separation of the oil and water. The tanks use various arrangements to assist separation of the two fluids so the oil may be withdrawn from the top of the tank and water withdrawn from the bottom of the tank. There is still need, however, for a wash tank which effectively promotes the separation of oil and water so as to permit a relatively small tank to be used, thus saving space and improving the transit time through the tank.

BRIEF DESCRIPTION OF THE PRESENT INVENTION

The present invention provides a tank for separating an oil-water mixture. The tank is preferably an upright cylindrical tank having a closed bottom. An inlet for an oil-water mixture is formed in the side of the tank above the horizontal centerline thereof. An outlet for oil is provided on the opposite side of the tank away from the inlet. The outlet for oil is also above the horizontal centerline of the tank and slightly below the oil-water inlet. An outlet for water is also formed in the opposite side of the tank below the outlet for oil and near the bottom of the tank. Control means are used to control the flow of the oil-water mixtures into the tank through the inlet an out of the tank through the outlets. The control means permit establishment and maintenance of a predetermined liquid level within the tank. The control means provide for maintaning such a liquid level within the tank by adjusting the flow rates of the oil-water mixture into the tank and of water and oil from the tank.

Baffle sections are connected across the tank to prevent channeling of the oil-water mixture and to thus promote separation of oil and water. A first baffle section extends completely across the tank near the oil-water mixture inlet. The first baffle section includes a perpendicular solid portion extending from above the inlet for the oil-water mixture in the tank to a position below the inlet for the oil-water mixture. The perpendicular solid portion of the first baffle section is arranged substantially normal to the axis of flow of the oil-water mixture into the tank through the inlet and is spaced apart from the inlet to divert the incoming flow of the oil-water mixture in a downward direction. The first baffle section also includes an inclined perforated portion extending downwardly in the direction of flow from the lower edge of the perpendicular solid portion.

A second baffle section is spaced downstream from the first baffle section and also extends completely across the tank and is in parallel relationship with the solid portion of the first baffle section. The second baffle section includes a substantially perpendicular solid plate portion located entirely within the projected liquid-containing portion of the tank and permits flow of liquid both above and below the upper and lower edges of the plate portion.

A third baffle section is spaced downstream from the second baffle section and extends completely across the tank. The third baffle section includes a solid perpendicular wall portion extending from the projected liquid level in the tank to a position below the liquid level to again divert the flow of the oil-water mixture in a downward direction. The solid perpendicular wall portion is in parallel spaced apart relationship with the perpendicular portions of the first and second baffle sections. The third baffle section also includes an inclined perforated portion extending downwardly in the direction of flow from the lower edge of the solid perpendicular wall portion.

The first baffle section is located in the upstream half of the tank. The second baffle section is located near the center of the tank and the third baffle section is located in the downstream half of the tank. In this manner, the baffles assist the separation of oil from water in a relatively small capacity tank.

OBJECTS OF THE INVENTION

A particular object of the present invention is to provide a wash tank for facilitating the separation of oil from water utilizing a series of baffle sections spaced apart in special configuration in the tank. Further objects and advantages of the present invention will become apparent from the following detailed description, read in light of the accompanying drawings, which are made a part of this specification.

DETAILED DESCRIPTION OF THE PREFERRED EMBODIMENT

Figure 2:
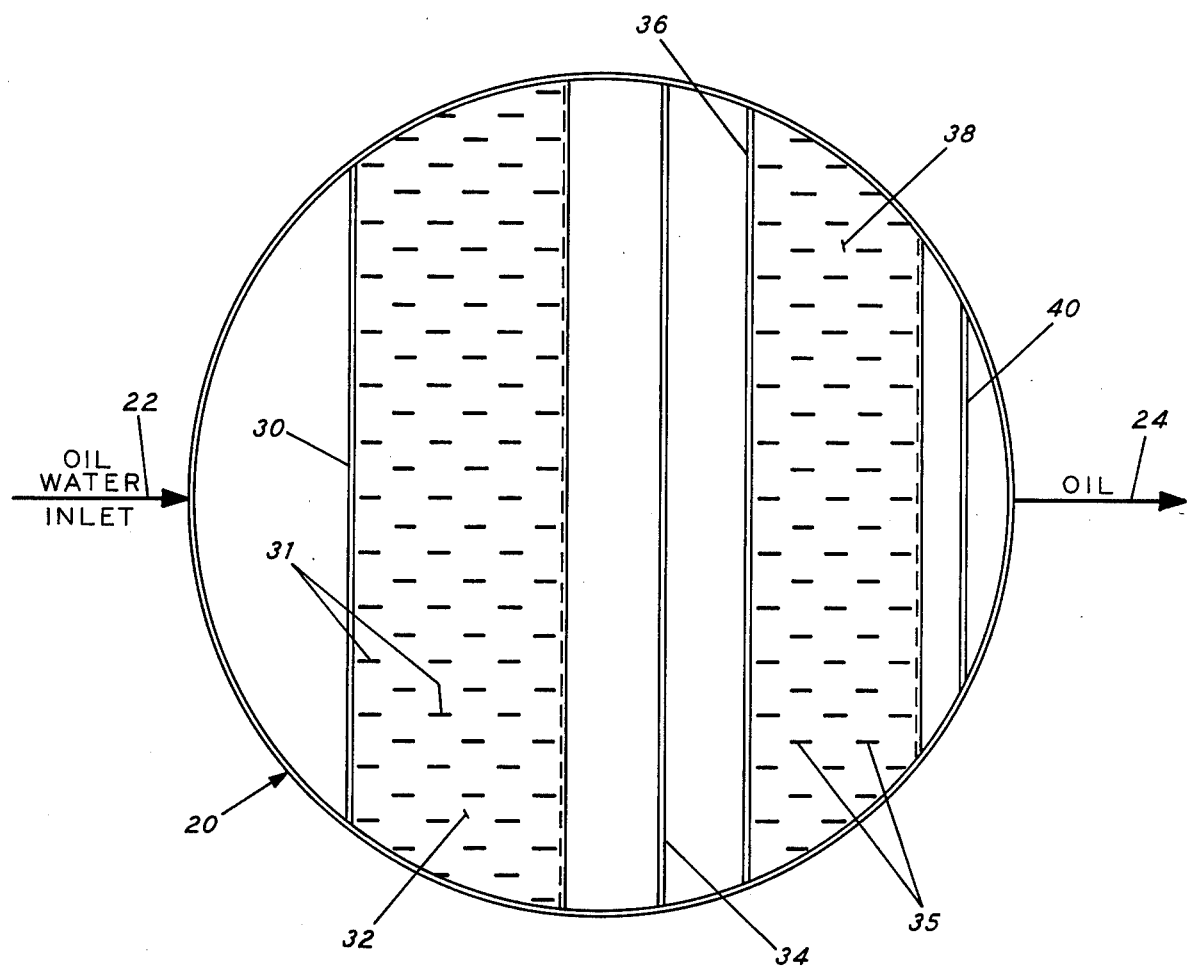
FIG. 2 is a sectional view taken at line 2—2 of FIG. 1.
Figure 1:
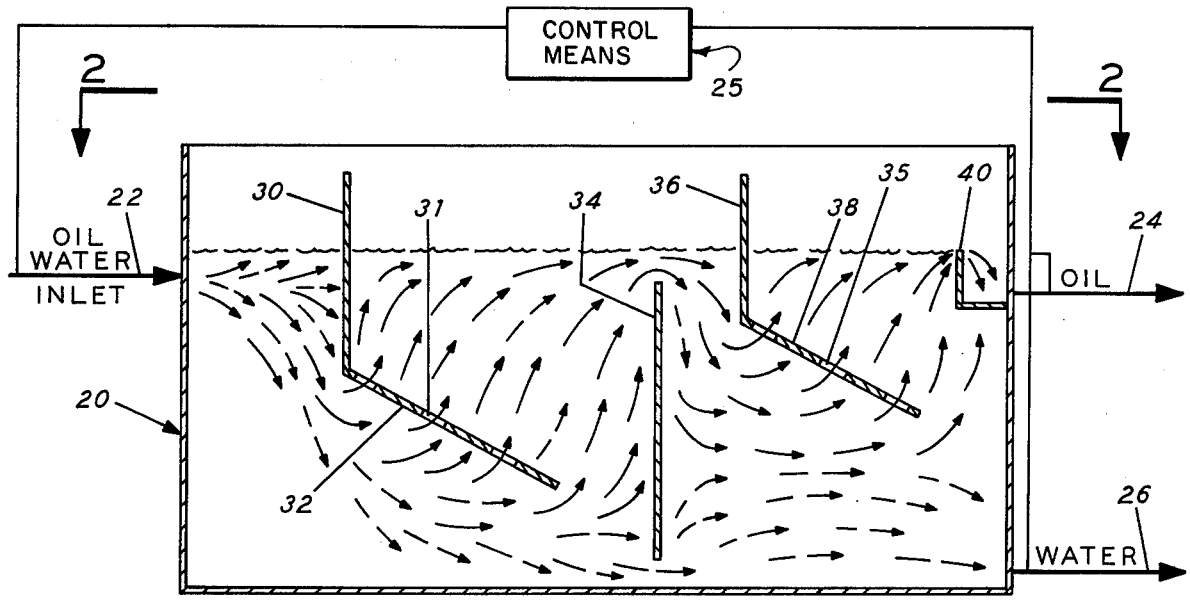
FIG. 1 is an elevation view with portions broken away for clarity of presentation illustrating the preferred embodiment of the apparatus assembled in accordance with the present invention.

FIG. 1 is an elevation view with portions broken away for clarity of presentation of apparatus assembled in accordance with the present invention. FIG. 2 is a sectional view taken at line 2—2 of FIG. 1.

A tank generally indicated as 20 is shown for separating an oil-water mixture. An inlet 22 for an oil-mixture is formed in the side of the tank above the horizontal centerline thereof. The oil-water mixture may be, for example, production from one or more oil wells. An outlet 24 for oil is provided on the oppostie side of the tank away from the oil-water inlet 20. The outlet 24 for oil also above the horizontal centerline of the tank 20 and slightly below the oil-water inlet 22. An outlet 26 for water is also formed in the opposite side of the tank below the outlet 24 for oil and near the bottom of the tank. Control means 25 are used to control the flow of the oil-water mixtures into the tank 20 through the inlet 22 and out of the tank through the outlets 24, 26. The control means permit establishment and maintenance of a predetermined liquid level within the tank. The control means provide for maintaining such a liquid level within the tank by adjusting the flow rates of the oil-water mixture into the tank and of water and oil from the tank. The flow rates are usually adjusted to provide minimum residence time in the tank commensurate with the desired degree of separation of oil and water.

Baffle sections are connected across the tank to prevent channeling of the oil-water mixture and to thus promote separation of oil and water. A first baffle section extends completely across the tank near the oil-water mixutre inlet. The first baffle section includes a perpendicular solid portion 30 extending from above the inlet 22 for the oil-water mixture in the tank to a position below the inlet for the oil-water mixture 22. The perpendicular solid portion 30 of the first baffle section is arranged substantially normal to the axis of flow of the oil-water mixture into the tank through the inlet 22 and is spaced apart from the inlet to divert the incoming flow of the oil-water mixture in a downward direction. The first baffle section also includes an inclined perforated portion 32 extending downwardly in the direction of flow from the lower edge of the perpendicular solid portion. The flow patterns are indicated by arrows. Solid arrows indicate oil and dashed arrows indicate water. The inclined perforated portion 132 preferably forms an angle of 135° with the perpendicular solid portion 30. Angles of from 110° to 150° have been found satisfactory. The perforations 31 in the inclined portion 32 are preferably small slots on the order of 4 inches by ¼ inch and are spaced evenly in rows on the portion 32.

A second baffle section is spaced downstream from the first baffle section and also extends completely across the tank and is in parallel relationship with the solid portion of the first baffle section. The second baffle section includes a substantially perpendicular solid plate portion 34 located entirely within the projected liquid-containing portion of the tank and permits flow of liquid both above and below the upper and lower edges of the plate portion as indicated by the arrows. Primarily, oil flows over the top of the plate portion 34 and primarily, water flows under the plate portion 34.

A third baffle section is spaced downstream from the second baffle section and extends completely across the tank. The third baffle section includes a solid perpendicular wall portion 36 extending from above the projected liquid level in the tank to a position below the liquid level to again divert the flow of the oil-water mixture in a downward direction. The solid perpendicular wall portion is in parallel spaced apart relationship with the perpendicular portions 30, 34 of the first and second baffle sections. The thrid baffle section also includes an inclined perforated portion 38 extending downwardly in the direction of flow from the lower edge of the solid perpendicular portion. This portion also contains slots 35 to permit oil to flow there through. The perforated portion 38 preferably makes an angle of 135° with the perpendicular portion 36. Angles of from 110° to 150° are suitable.

The first baffle section is located in the upstream half of the tank. The second baffle section is located near the center of the tank and the third baffle section is located in the downstream half of the tank. In this manner, the baffles assist the separation of oil from water in a relatively small capacity tank.

Thus, the present invention provides a method of assisting the separation of an oil-water mixture which includes preheating an oil-water mixture to a temperature between about 150° F and 180° F. The oil-water mixture is flowed into a tank above the horizontal center line thereof at a rate between 900 barrels per day and 1600 barrels per day. The flow of said oil-water mixture is then directed in a downward direction in the initial portion of the tank. At least a portion of the oil-water mixture is then flowed in an upward direction through openings in an inclined perforated baffle. The flow is then split near the middle of the tank and a predominantly oil-containing portion of the oil-water mixture is flowed close to the surface of the liquid level in the tank while a predominantly water containing portion of the oil-water mixture is flowed close to the bottom of the tank. The predominantly oil portion of the oil-water mixture is then passed in an upward direction through a slotted baffle near the exit from the tank, while the predominantly water portion of the oil-water mixture is passed below the slotted baffle. The predominantly oil portion of the oil-water mixture is removed from the upper portion of the tank and the predominantly water portion of the oil-water mixture is removed from the bottom portion of the tank.

In operation, the produced oil-water mixture enters the tank slightly below the fluid level. Six to 12 inches is preferred. The crude is defoamed and degassed immediately on entering the tank. Heat and chemicals are preferably used. Preferably the oil-water mixture is preheated to between about 150° and 180° F. The oil-water mixture spreads out laterally in both directions as it contacts the first solid baffle 30. The oil and water travel in a downward direction with the free water dropping to the bottom of the tank. The oil and water are forced down and spread along the first slotted portion 32. As the mixture works its way up through the slots 31, the oil rises to the top of the tank. The wetter oil is carried down lower on the baffle and is forced close to the oil-water interface. As oil and water strike the middle baffle 34, the free water continues under the baffle. The oil travels up and close to the clean oil at the top of the tank before it starts its descent over the middle baffle 34. The clean oil near the surface of the tank between the perpendicular portion 30 and perpendicular portion 36 is forced down again and comingles with the slightly dirtier oil spilling over the center baffle 34. The clean oil then finds its way up through the slots 35 in the sloping portion 38 of the third baffle. The oil spreads out as it rises to the surface behind the third baffle and is then pulled toward the skimmer 40. The water is pulled off close to the bottom.

In a field demonstration, a 260-barrel tank was provided with baffle sections substantially as shown in FIGS. 1 and 2. The actual usable volume of the tank was about 200 barrels. The fluid mixture contained about 30 to 40 % water, with the remainder oil of about 14 gravity. From 900 barrels per day to about 1600 barrels per day of fluid were handled. The fluid was preheated to a temperature between 150° F and 180° F. The higher temperature was used when the throughput was in the 1600-B/D range and the lower temperature for the 900-B/D throughput. A standard emulsion-breaker chemcial was used. The oil came out of the tank with less than 3% water. The water percentage in the clean oil was typically 1% to 2.5%. This oil went to the pipeline. The water coming out of the tank typically contained less than 1% oil and went into the water disposal system.

Although only certain specific embodiments of apparatus have been described herein, the invention is not limited to only these embodiments, but rather by the scope of the appended claims.

What is claimed is:

1. Apparatus for separating an oil-water mixture comprising a tank having a closed bottom, an inlet for an oil-water mixture in the side of said tank above the horizontal centerline thereof, an outlet for oil on the opposite side of said tank away from said inlet, said outlet for oil being above the horizontal centerline of said tank, an outlet for water in the said oppostie side of said tank below said outlet for oil and near the bottom of said tank, control means for controlling flow into said tank through said inlet and out of said tank through said outlet for oil and said outlet for water to permit establishment of a desired liquid level in said tank, a first baffle section connected across said tank, said first baffle section comprising a perpendicular solid portion extending from above the said inlet for oil-water mixture in said tank to a position below said inlet for oil-water mixture and being normal to the axis of flow of oil-water mixture into said tank through said inlet and spaced apart from said inlet to divert the incoming flow of said oil-water mixture in a downward direction and an inclined perforated portion extending downwardly and inwardly in the direction of flow from the lower edge of said perpendicular solid portion, a second baffle section spaced downstream from said first baffle section and connected across said tank comprising a substantially perpendicular solid plate portion contained entirely within the liquid-cotaining portion of said tank to permit flow of liquid both above and below the upper and lower edges of said plate portion and a third baffle section spaced downstream from said second baffle section and connected across said tank and comprising a solid perpendicular wall portion extending from above the liquid level in said tank to a position below said liquid level to divert the flow of said oil-water mixture in a downward direction and an inclined perforated portion extending downwardly and inwardly in the direction of flow from the lower edge of said solid perpendicular wall portion.

2. The apparatus of claim 1 further characterized in that the tank is an upright cylindrical tank.

* * * * *